(12) United States Patent
Riviere-Cazaux (10) Patent No.: US 9,566,980 B2
(45) Date of Patent: Feb. 14, 2017

(54) AUTOMOBILE DRIVER IMPROVED RESPONSE TIMES USING PRIMING

(71) Applicant: QUALCOMM Incorporated, San Diego, CA (US)

(72) Inventor: Lionel Riviere-Cazaux, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 14/639,222

(22) Filed: Mar. 5, 2015

(65) Prior Publication Data

US 2016/0257305 A1    Sep. 8, 2016

(51) Int. Cl.
| | |
|---|---|
| *B60W 30/09* | (2012.01) |
| *B60W 10/18* | (2012.01) |
| *B60W 10/30* | (2006.01) |
| *B60W 50/14* | (2012.01) |
| *B60K 28/14* | (2006.01) |
| *G09B 19/16* | (2006.01) |

(52) U.S. Cl.
CPC ............. *B60W 30/09* (2013.01); *B60K 28/14* (2013.01); *B60W 10/18* (2013.01); *B60W 10/30* (2013.01); *B60W 50/14* (2013.01); *G09B 19/167* (2013.01); *B60W 2420/42* (2013.01); *B60W 2710/18* (2013.01); *B60W 2710/30* (2013.01)

(58) Field of Classification Search
None
See application file for complete search history.

(56) References Cited

U.S. PATENT DOCUMENTS

| | | | | |
|---|---|---|---|---|
| 5,979,586 | A * | 11/1999 | Farmer | B60Q 9/008 180/169 |
| 6,525,656 | B1 | 2/2003 | Hahn | |
| 7,253,389 | B2 * | 8/2007 | Yoshida | B60R 1/00 250/208.1 |
| 7,359,782 | B2 | 4/2008 | Breed | |
| 9,398,420 | B2 * | 7/2016 | Horvitz | G08G 1/01 |

(Continued)

FOREIGN PATENT DOCUMENTS

| | | |
|---|---|---|
| DE | 102012002926 A1 | 8/2013 |
| JP | 2005231381 A | 9/2005 |

OTHER PUBLICATIONS

Navarro J., et al., "Objective and subjective evaluation of motor priming and warning systems applied to lateral control assistance," Accident Analysis and Prevention, 2010, vol. 42, pp. 904-912.

(Continued)

*Primary Examiner* — Truc M Do
*Assistant Examiner* — Jess Whittington
(74) *Attorney, Agent, or Firm* — The Marbury Law Group, PLLC (57) ABSTRACT

Systems, methods, and devices of the various embodiments enable masked priming stimuli to be provided to machine operators in advance of audible warnings issued by a safety warning system of a manned machine system when an emergency is imminent. In the various embodiments, the safety warning system of the manned machine system may output a masked priming stimulus in response to the machine operator performing a target action to teach a machine operator to take the target action associated with an emergency.

17 Claims, 7 Drawing Sheets

(56) References Cited

U.S. PATENT DOCUMENTS

| | | | |
|---|---|---|---|
| 2008/0084287 A1 | 4/2008 | Sturm | |
| 2008/0201039 A1* | 8/2008 | Matsuoka | B60W 50/16 |
| | | | 701/41 |
| 2011/0071761 A1* | 3/2011 | Cummings | B60W 30/09 |
| | | | 701/301 |
| 2012/0050026 A1* | 3/2012 | Westerblad | B60R 21/0134 |
| | | | 340/436 |
| 2013/0006469 A1* | 1/2013 | Green | G07C 5/008 |
| | | | 701/36 |
| 2013/0226369 A1* | 8/2013 | Yorio | G06F 17/00 |
| | | | 701/1 |
| 2015/0187146 A1* | 7/2015 | Chen | G07C 5/008 |
| | | | 701/31.5 |

OTHER PUBLICATIONS

Riener A., "Challenges of subliminal information displays in the car-context," 2010, pp. 24.
International Search Report and Written Opinion—PCT/US2016/013387 ISA/EPO—Apr. 25, 2016.

\* cited by examiner

AUTOMOBILE DRIVER IMPROVED RESPONSE TIMES USING PRIMING

BACKGROUND

Current manned machine systems (e.g., automobiles, tractors, airplanes, trains, cranes, space vehicles, etc.) often include safety warning systems that can identify adverse conditions (e.g., abrupt braking of other cars, equipment malfunction, low altitude, high winds, etc.) and provide audible, visual and/or haptic warnings to the machine operators (e.g., drivers, pilots, etc.) to prompt the operator to take a corrective action (e.g., braking, accelerating, steering, stopping/starting systems, etc.) to avoid a mishap (e.g., a crash, collision, system failure, etc.). The goal of providing low "false warning" rates for these systems so operators do not become desensitized, means that the warning is provided only when the mishap is sure to happen and thus is imminent. This gives the machine operator only a small amount of time in which to react and take the appropriate corrective action after hearing, seeing, or feeling the warning in current safety warning systems. This short reaction time can prevent a machine operator from taking appropriate corrective action in time to avoid a mishap. Additionally, the adverse conditions that cause current safety warning systems to generate audible, visual and/or haptic warnings are rare events. As a result, the machine operators do not develop a trained or reflexive reaction to the warnings. Rather, the machine operators often are confused by the warnings generated by current safety warning systems adding to the overall reaction time.

SUMMARY

The systems, methods, and devices of the various embodiments enable masked priming stimuli (i.e., subconsciously perceived stimuli) to be provided to machine operators in advance of audible warnings issued by a safety warning system of a manned machine system when an emergency is imminent. In the various embodiments, the safety warning system of the manned machine system may output a masked priming stimulus in response to the machine operator performing a target action to train a machine operator to take the target action associated with an emergency. In an embodiment, in response to determining that the machine condition is outside a normal condition by a threshold and above a potential emergency condition threshold, the safety warning system of the manned machine system may output the masked priming stimulus associated with the target action associated with the emergency. The machine operator's conditioned response to the masked priming stimulus may be leveraged by the safety warning system to prepare the machine operator to take the target action and/or cause the machine operator to begin taking the target action prior to any overt danger warning associated with the emergency being provided to the machine operator.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "mobile computing device" is used herein to refer to any one or all of cellular telephones, smart-phones, web-pads, tablet computers, Internet enabled cellular telephones, personal data assistants (PDA's), laptop computers, personal computers, media players, wearable devices, and similar electronic devices equipped with at least a processor. In various embodiments, such mobile computing devices may be further configured with a transceiver (e.g., an LTE, 3G, 4G, Bluetooth, WiFi, etc., wireless network transceiver or wired transceiver) to establish data connections with various devices in manned machine systems.

The term "manned machine system" is used herein to refer to any one or all of automobiles, trucks, tractors, airplanes, trains, cranes, space vehicles, and similar systems configured for a human operator to take an action to control the operation of the system. In various embodiments, such manned machine systems may be configured with a safety warning system that may monitor machine conditions and provide audible, visual and/or haptic outputs to the human operator to prompt the operator to take an action.

Various embodiments are described using a car as an example manned machine system. The discussions of the various embodiments with reference to implementation in cars are provided merely as examples to better illustrate the aspects of the various embodiments, and are not intended to limit the claims to implementations in cars unless specifically recited. Other manned machine systems (e.g., trucks, tractors, airplanes, trains, cranes, space vehicles, etc.) may use or be used with the various embodiments, and other manned machine systems may be substituted in the various examples discussed herein.

Psychological/cognitive studies of human reactions have shown that providing a priming stimulus (or preparatory signal) in advance of a target stimulus can improve a person's response time in performing an action associated with the target stimulus. This technique of association between stimuli and actions is sometimes called "response priming" or merely "priming." A subcategory of priming is "masked priming" in which the priming stimulus is provided in a manner that is sufficiently brief or subtle that the priming stimulus is not consciously perceived even though the person actually sees, feels and/or hears the priming stimulus, (i.e., the priming stimulus is subconsciously or subliminally perceived).

The systems, methods, and devices of the various embodiments provide priming of masked priming stimuli (i.e., subconsciously perceived stimuli) to machine operators as well as providing the masked priming stimuli in advance of audible warnings issued by a safety warning system of a manned machine system when an emergency is imminent. In the various embodiments, a safety warning system of a manned machine system may monitor one or more machine condition of the manned machine system to identify when the masked priming stimuli should be provided to the operator. Machine conditions may be monitored based on one or more sensor outputs (e.g., readings, measurements, values, etc.) from one or more sensors of the manned machine system received by the safety warning system. For example, speed sensors, braking sensors, pressure sensors, cameras, etc., may send sensor outputs to a processor of the safety warning system, and based on the received sensor outputs the processor of the safety warning system may determine one or more machine conditions. In this manner the safety warning system may monitor the machine conditions for situations in which the operator should receive masked priming stimuli.

In the various embodiments, the safety warning system of the manned machine system may compare the monitored and/or determined machine conditions to threshold values corresponding to the conditions to recognize an operating condition of the manned machine system in which the operator should receive masked priming stimuli. Different threshold values may be associated with different operating conditions. As an example, a normal condition threshold may be a threshold value for a machine condition associated with a state in which there may be no or little risk of an emergency occurring. A potential emergency threshold may be a threshold value for a machine condition associated with a state in which there may be some risk of an emergency occurring but an emergency is not imminent. An emergency threshold may be a threshold value for a machine condition associated with a state in which an emergency may be imminent.

In the various embodiments, the safety warning system of the manned machine system may output a masked priming stimulus in response to the machine operator performing a target action in order to teach the machine operator to associate the stimuli and the target action. Target actions may include braking (particularly a hard braking action), accelerating, steering, stopping/starting systems, etc., and emergencies may include imminent crashes, collisions, over speeding, stalls, overheating, etc. In the various embodiments, the masked priming stimulus may be any type priming stimulus that is not consciously perceived by the machine operator (i.e., the priming stimulus is subconsciously perceived or subliminally perceived). As an example, the masked priming stimulus may be an audio signal, such as a brief audio tone. To be imperceptible, the masked priming stimulus may be an audio tone of about 500 Hz that is played for a duration of 10 ms to 100 ms at 65 db. An audio signal used as the masked priming stimulus may be advantageous when the machine operator is conducting a phone call (e.g., talking, listening, etc.) because priming may have greater efficiency when the attention mode of the operator and the mode of priming are the same (e.g., audio call and audio priming). Through the repeated output of the masked priming stimulus in response to the operator taking the corresponding target action, the machine operator may be subconsciously or subliminally taught to associate the masked priming stimulus with the target action.

In an embodiment, the safety warning system of the manned machine system may determine whether the machine condition is outside of normal conditions (e.g., outside of normal conditions by a threshold amount) but a potential emergency is not occurring (e.g., the machine condition is at or below the potential emergency threshold). In response to determining that the machine condition is outside of normal conditions but that a potential emergency is not occurring, the safety warning system may output the masked priming stimulus associated with the target action associated with the emergency. In this manner, the machine operator may be trained to associate the masked priming stimulus with taking the target action or at least with the need to take an action when machine conditions are not normal, while avoiding generating an overt danger warning associated with the emergency (e.g., an audible tone). This avoidance of generating overt danger warnings associated with the emergency while training the machine operator to respond to the masked priming stimulus may prevent the machine operator from becoming desensitized to the overt danger warnings during training.

In the various embodiments, the masked priming stimulus may be repeated often enough to maintain the conditioning of the machine operator. The cognitive association that the masked priming stimulus should result in the target action may be achieved by conditioning the machine operator by outputting the masked priming stimulus when the target action is taken. For example, the cognitive association that a masked priming stimulus audio signal should result in braking may be achieved by conditioning a driver by outputting the masked priming stimulus audio signal when the driver brakes. Thus, to maintain the conditioning of the machine operator, enough learning events (e.g., events resulting in the machine operator taking the target action) must occur at a minimum frequency to maintain the conditioning. In various embodiments, the minimum frequency to maintain the conditioning may be achieved by outputting the masked priming stimulus associated with the target action associated with the emergency any time that the target action is taken and the safety warning system determines that the machine condition is outside of normal conditions but that a potential emergency is not occurring. In other embodiments, the minimum frequency to maintain the conditioning may be achieved by outputting the masked priming stimulus associated with the target action associated with the emergency a percentage of times that the target action is taken and the safety warning system determines that the machine condition is outside of normal conditions but that a potential emergency is not occurring (e.g., 75 percent of the time, 25 percent of the time, etc.).

In an embodiment, in response to determining that the machine condition is outside of normal conditions by the threshold amount and above the potential emergency condition threshold, the safety warning system of the manned machine system may output the masked priming stimulus associated with the target action associated with the emergency. In this manner, in anticipation of an emergency becoming imminent, the safety warning system may provide the masked priming stimulus to prime the machine operator to take the target action and/or cause the machine operator to begin taking the target action. The machine operator's conditioned response to the masked priming stimulus may be to perform the target action, which may prevent the emergency from occurring and the machine condition from exceeding the emergency threshold. The ability to initially provide the masked priming stimulus without the machine operator consciously perceiving the stimulus may prevent the machine operator from becoming desensitized to the overt danger warning because the overt danger warning may not be output when the emergency does not become imminent. In an embodiment, when the machine condition is determined to be at or above the emergency threshold the safety warning system of the manned machine system may output the overt danger warning associated with the emergency. In this manner, the machine operator may first receive the masked priming stimulus associated with the target action associated with the emergency and then receive the overt danger warning associated with the emergency when the emergency is imminent. The masked priming of the machine operator and the training of the machine operator to respond with the target action in response to the masked priming stimulus may improve the machine operator's response time in performing the target action upon receiving the overt danger warning.

In the various embodiments, the masked priming stimulus may be output by injecting a masked priming stimulus audio signal (e.g., a first tone that is a subconsciously perceived or subliminally perceived tone) into an time voice call audible audio stream being output in the manned machine system. In the various embodiments, the overt danger signal may be output by injecting an overt danger audio signal (e.g., a second tone that is a consciously perceptible tone) into the audible audio stream being output in the manned machine system. Example audible audio streams may include media audio streams or hands free voice call audio streams in cars, air traffic control radio streams in planes, etc.

Figure 1:
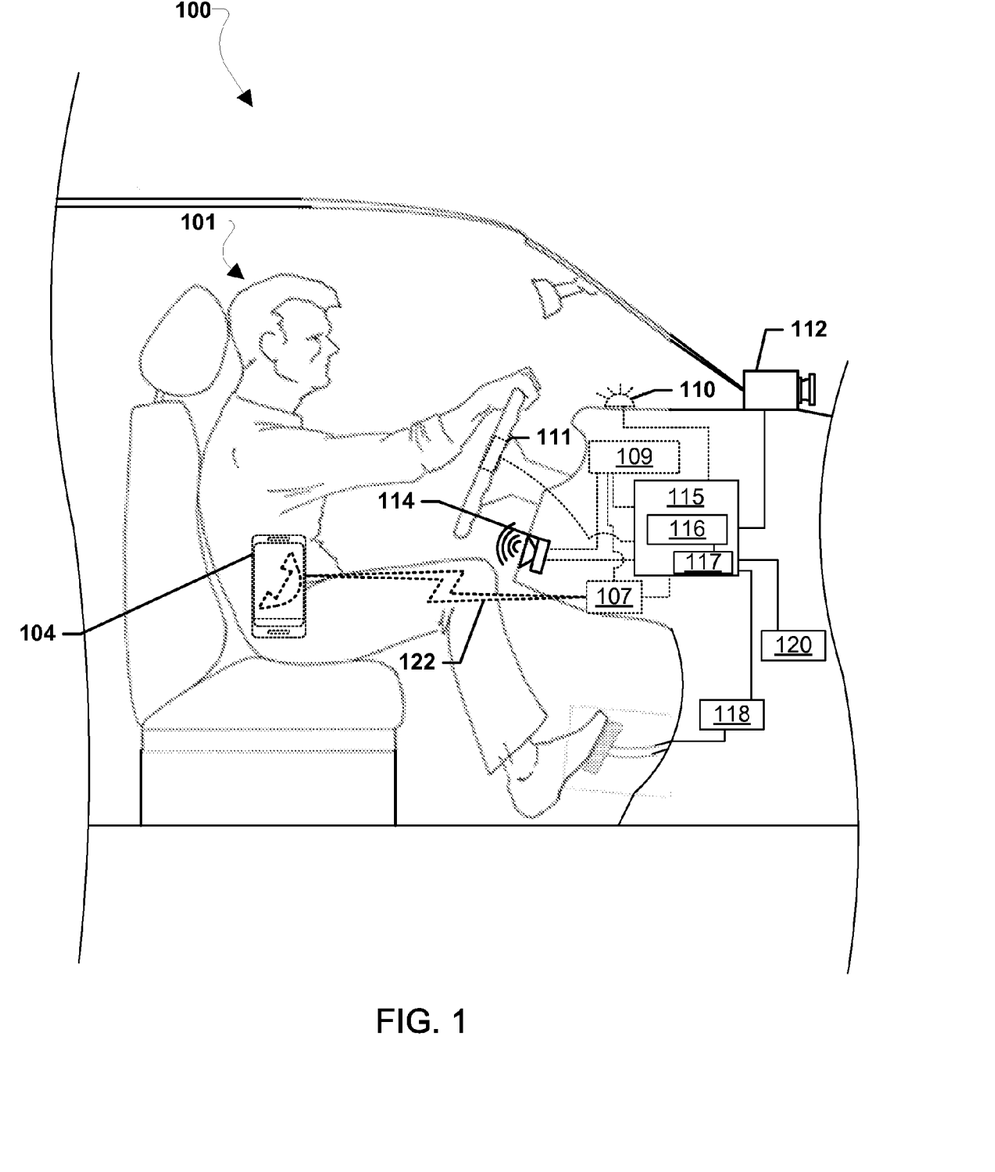
FIG. 1 is system block diagram of a manned machine system suitable for use with the various embodiments.

FIG. 1 is system block diagram of a manned machine system 100 operated by a machine operator 101. The manned machine system 100 may include a safety warning system 115 that may include at least one processor 116 connected to at least one memory 117. In the various embodiments, the memory 117 may store various processor executable instructions and other data, such as normal condition threshold values, potential emergency threshold values, emergency threshold values, sensor output data, etc. that may be used and/or executed by the processor 116. The processor 116 of the safety warning system 115 may be connected to various sensors in the manned machine system 100, such as a camera 112, an accelerometer 120, a braking sensor 118, etc. The sensors 112, 120, and 118 may output sensor data to the processor 116 of the safety warning system 115, and based on the sensor output the processor 116 of the safety warning system 115 may monitor and determine machine conditions of the manned machine system 100. The processor 116 of the safety warning system 115 may be connected to various sensors in the manned machine system 100 via one or more wired communication links (e.g., a Controller Area Network (CAN) protocol compliant bus, Universal Serial Bus (USB) connection, Firewire connection, etc.) and/or wireless communication links (e.g., a Wi-Fi® link, Bluetooth® link, ZigBee® link, ANT+® link, etc.).

The processor 116 of the safety warning system 115 may be connected to one or more speakers 114, one or more haptic devices 111 (e.g., a motor), and one or more lights 110 (e.g., a dedicated light, display, etc.) for outputting signals to the operator 101, such as a audio, haptic, and/or visual signals, respectively. The processor 116 of the safety warning system 115 may optionally connect directly to the speaker 114, haptic device 111, and/or light 110, or may optionally connect through other systems of the manned machine system 100, such as an audio system 109 (e.g., a car radio system and/or hands free calling system) that connects the processor 116 to the speaker 114. The speaker 114, haptic device 111, and/or light 110 may be devices dedicated to outputting signals to the operator from the safety warning system 115 or may be devices with other uses in the manned machine system 100. The processor 116 of the safety warning system 115 may be connected to the speaker 114, haptic device 111, light 110 and/or audio system 109 in the manned machine system 100 via one or more wired communication links (e.g., a Controller Area Network (CAN) protocol compliant bus, Universal Serial Bus (USB) connection, Firewire connection, etc.) and/or wireless communication links (e.g., a Wi-Fi® link, Bluetooth® link, ZigBee® link, ANT+® link, etc.).

The manned machine system 100 may include a wireless or wired transceiver 107 connected to the processor 116 of the safety warning system 115 and/or the audio system 109, for exchanging data with various devices in the manned machine system 100, such as a mobile computing device carried by the operator 101, such as a smart phone 104). As an example, the smart phone 104 may wirelessly exchange data with the transceiver 107 and the processor 116 of the safety warning system 115 and/or the audio system 109 via a wireless communication link 122 and/or a wired communication link (not shown). The processor 116 of the safety warning system 115 and/or the audio system 109 may be connected to the transceiver 107 in the manned machine system 100 and/or may connect to the smart phone 104 via one or more wired communication links (e.g., a Controller Area Network (CAN) protocol compliant bus, Universal Serial Bus (USB) connection, Firewire connection, etc.) and/or wireless communication links (e.g., a Wi-Fi® link, Bluetooth® link, ZigBee® link, ANT+® link, etc.).

As an example, the manned machine system 100 may be a car and the operator 101 may be a driver. The smart phone 104 may connect to the transceiver 107 via a Bluetooth wireless link and may output an audio data stream of a voice call occurring on the smart phone 104 via the connection to the transceiver 107 to the car's audio system 109. The car's audio system 109 may output the audible audio stream of the voice call to the driver via the speaker 114. The safety warning system 115 may be a crash avoidance system that may determine whether a crash is imminent based on output sensor data from the camera 112 about oncoming traffic and speed data from the accelerometer 120. To train the driver to take a target action of applying the brakes when a crash is imminent, the crash avoidance system may cause the speaker 114, haptic device 111, and/or light 110 to output a masked priming stimulus to the driver (e.g., by injecting a masked priming stimulus audio signal into the audio stream of the voice call output by the speaker 114) when the crash avoidance system determines that the car's condition is outside of a normal condition threshold but below a potential crash threshold and the sensor output of the brake sensor 118 indicates that the driver applied the brake (i.e., performed the target action). In this manner, the driver may be trained to associate braking in a near emergency situation with the masked priming stimulus.

Continuing with the example, when the crash avoidance system determines that the car's condition is outside of a normal condition threshold and above the potential crash threshold, the crash avoidance system may cause the speaker 114, haptic device 111, and/or light 110 to output the masked priming stimulus to the driver (e.g., by injecting a masked priming stimulus audio signal into the audio stream of the voice call output by the speaker 114). In the event sensor outputs from the camera 112 and accelerometer 120 cause the crash avoidance system to determine that a crash is imminent, the crash avoidance system may cause the speaker 114, haptic device 111, and/or light 110 to output an overt danger warning associated with a crash consciously perceptible to the driver (e.g., by injecting a consciously perceptible audio signal into the audio stream of the voice call output by the speaker 114). In this manner, the driver may be primed to take the target action without consciously disturbing the driver, limiting the output of an emergency warning to situations in which the emergency is imminent. This may reduce false positives and desensitization of the driver in the event the emergency does not become imminent.

Figure 2:
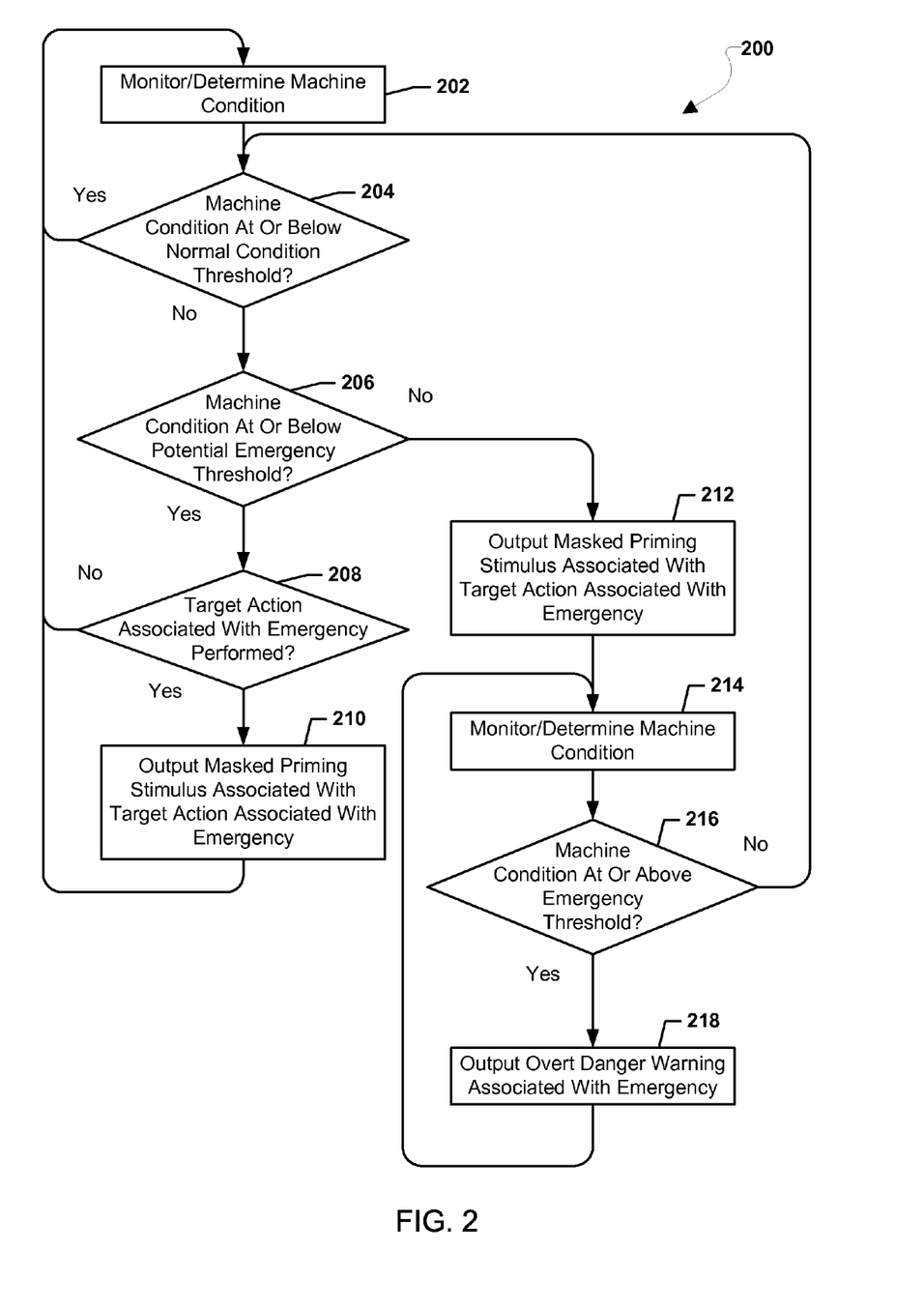
FIG. 2 illustrates an embodiment method for training a machine operator of a manned machine system to respond to a masked priming stimulus and warning the machine operator of a manned machine system that an emergency is imminent.

FIG. 2 illustrates a method 200 for training a machine operator of a manned machine system to respond to a masked priming stimulus and warning the machine operator of a manned machine system that an emergency is imminent. In an embodiment, the operations of method 200 may be performed by a processor of a manned machine system (e.g., a car, etc.), such as a processor of a safety warning system. In block 202 the processor of the safety warning system may monitor and determine a machine condition. For example, the processor of the safety warning system may receive sensor outputs from various sensors of the manned machine system and based at least in part on the received sensor outputs may monitor whether a machine condition has changed and/or determine the machine condition. Machine conditions may include a speed of the manned machine system (e.g., speed of a car, speed of an airplane, etc.), the state of other manned machine systems (e.g., speed of traffic in the pathway of a car, etc.), or any other state of the manned machine system and/or the operator of the manned machine system. Machine conditions may be monitored and/or determined based on multiple sensor outputs used in combinations, such as a car crash condition determined based on both a speed sensor output and a camera output indicative of a distance to objects in a forward path of travel of the car.

In determination block 204 the processor of the safety warning system may determine whether the machine condition is at or below a normal condition threshold. A normal condition threshold may be a threshold value for a machine condition associated with a state in which there may be no or little risk of an emergency occurring. For example, a normal condition threshold value for a car crash condition may be a maximum value for the car crash condition that indicates a crash is unlikely to occur.

In response to determining that the machine condition is at or below the normal condition threshold (i.e., determination block 204="Yes"), the processor of the safety warning system may continue to monitor/determine a machine condition in block 202.

In response to determining that the machine condition is outside of normal conditions by the threshold amount (i.e., determination block 204="No"), the processor of the safety warning system may determine whether the machine condition is at or below a potential emergency threshold in determination block 206. A potential emergency threshold may be a threshold value for a machine condition associated with a state in which there may be some risk of an emergency occurring but an emergency is not imminent. For example, a potential emergency threshold for a car crash condition may be a maximum value for the car crash condition that indicates a crash may occur but is not yet imminent.

In response to determining that the machine condition is at or below the potential emergency threshold (i.e., determination block 206="Yes"), the processor of the safety warning system may determine whether a target action associated with the emergency has been performed by the operator of the manned machine system. For example, a car's safety warning system's processor may determine whether the brake has been applied by the driver or the car based on sensor outputs from a brake sensor to determine whether a target action associated with the emergency has been performed by the operator of the manned machine system. In response to determining that the target action associated with the emergency has not been performed (i.e., determination block 208="No"), the processor of the safety warning system may continue to monitor/determine a machine condition in block 202.

In response to determining that the target action associated with the emergency has been performed (i.e., determination block 208="Yes"), the processor of the safety warning system may output a masked priming stimulus associated with the target action associated with the emergency in block 210. In this manner, the processor of the safety warning system may endeavor to train the operator of the manned machine system to associate the target action with the masked priming stimulus. As discussed above, the masked priming stimulus may be any type priming stimulus (e.g., visual, audible, haptic, etc.) that is not consciously perceived by the machine operator (i.e., the priming stimulus is subconsciously perceived or subliminally perceived). For example, a car's safety warning system's processor may output a masked priming stimulus as an audio signal, such as an audio tone, injected into an audio stream being output via a speaker to the driver of the car. Specifically, the masked priming stimulus may be an audio tone of about 500 Hz that is played for a 10 ms to 100 ms duration at 65 db. In an embodiment, the processor of the safety warning system may output the masked priming stimulus associated with the target action associated with the emergency any time that the target action is taken. In another embodiment, the processor of the safety warning system may output the masked priming stimulus associated with the target action associated with the emergency a percentage of times that the target action is taken. For example, the masked priming stimulus may be output 75 percent of the times that the target action is performed, 25 percent of the times that the target action is performed, or any percentage in the range between 75 percent and 25 percent of the times that the target action is performed. The processor of the safety warning system may act to ensure that the masked priming stimulus is repeated often enough to maintain the conditioning of the machine operator by appropriately setting or adjusting the percentage of times that the masked priming stimulus associated with the target action associated with the emergency is output in response to the target action being taken when the machine condition is at or below the potential emergency threshold.

In response to determining that the machine condition above the potential emergency threshold (i.e., determination block 206="No"), the processor of the safety warning system may output the masked priming stimulus associated with the emergency in block 212. In this manner, the processor of the safety warning system may output the masked stimulus to the operator of the manned machine system when an emergency may be imminent to prime the response of the operator. With the training discussed above, the operator may be conditioned to begin taking and/or to take the target action upon receiving the masked priming stimulus. For example, a car's driver properly conditioned by previous training with the masked priming stimulus may begin to brake the car in response to the masked priming stimulus even though the priming stimulus is not consciously perceived.

In block 214, the processor of the safety warning system may again monitor/determine the machine condition in a manner similar to that described above with reference to block 202, and in determination block 216 the processor of the safety warning system may determine whether the machine condition is at or above an emergency threshold. An emergency threshold may be a threshold value for a machine condition associated with a state in which an emergency may be imminent. For example, an emergency threshold may be a value above which a crash condition for a car indicates a crash is imminent.

In response to determining that the machine condition is below the emergency threshold (i.e., determination block 216="No"), the safety warning system processor may continue to determine whether the machine condition is at or below a normal condition threshold in determination block 204. In this manner, should the machine condition not return to normal (i.e., determination block 204="No") and remain above the potential emergency threshold (i.e., determination block 206="No"), the processor of the safety warning system may repeatedly output the masked priming stimulus in block 212 until the emergency condition becomes imminent (i.e., determination block 216="Yes") or the machine condition returns to normal (i.e., determination block 204="Yes").

In response to determining that the machine condition is at or above the emergency threshold (i.e., determination block 216="Yes"), the safety warning system processor may output an overt danger warning associated with the emergency in block 218. The overt danger warning associated with the emergency may be any type stimulus (e.g., visual, audible, haptic, etc.) that is consciously perceived by the machine operator. For example, the overt warning may be an audible tone or synthetic speech indicated "brake" in a car. In this manner, the machine operator may first receive the masked priming stimulus associated with the target action associated with the emergency and then receive the overt danger warning associated with the emergency when the emergency actually become imminent. The masked priming of the machine operator and the training of the machine operator to respond with the target action in response to the masked priming stimulus may improve the machine operator's response time in performing the target action upon receiving the overt danger warning. Upon issuing the overt danger warning in block 218, the safety warning system processor may proceed to block 214 to monitor/determine the machine condition. In this manner, the overt danger warning may be repeatedly issues until the machine condition falls below the emergency threshold (i.e., determination block 216="No").

FIGS. 3A, 3B, 3C, and 3D are process flow diagrams illustrating various embodiment operations performed by an example manned machine system to train and warn a machine operator. The operations illustrated in FIGS. 3A-D may be performed by a processor of a smart phone in communication with a processor of a car audio system in communication with a processor of a crash avoidance system. The operations illustrated in FIGS. 3A-D performed by the processor of the crash avoidance system may represent a specific example implementation of the operations of method 200 described above with reference to FIG. 2.

In blocks 302 and 304 (FIG. 3A) the processor of the smart phone and the processor of the car audio system may establish a Bluetooth connection with each other, for example according to the Bluetooth Hands Free Protocol. In block 306 the processor of the crash avoidance system may monitor a car crash condition. As discussed above, the car crash condition may be monitored based on sensor outputs, such as speed sensors and forward looking cameras, etc. The crash avoidance system may continually monitor the car crash condition.

Figure 3A:
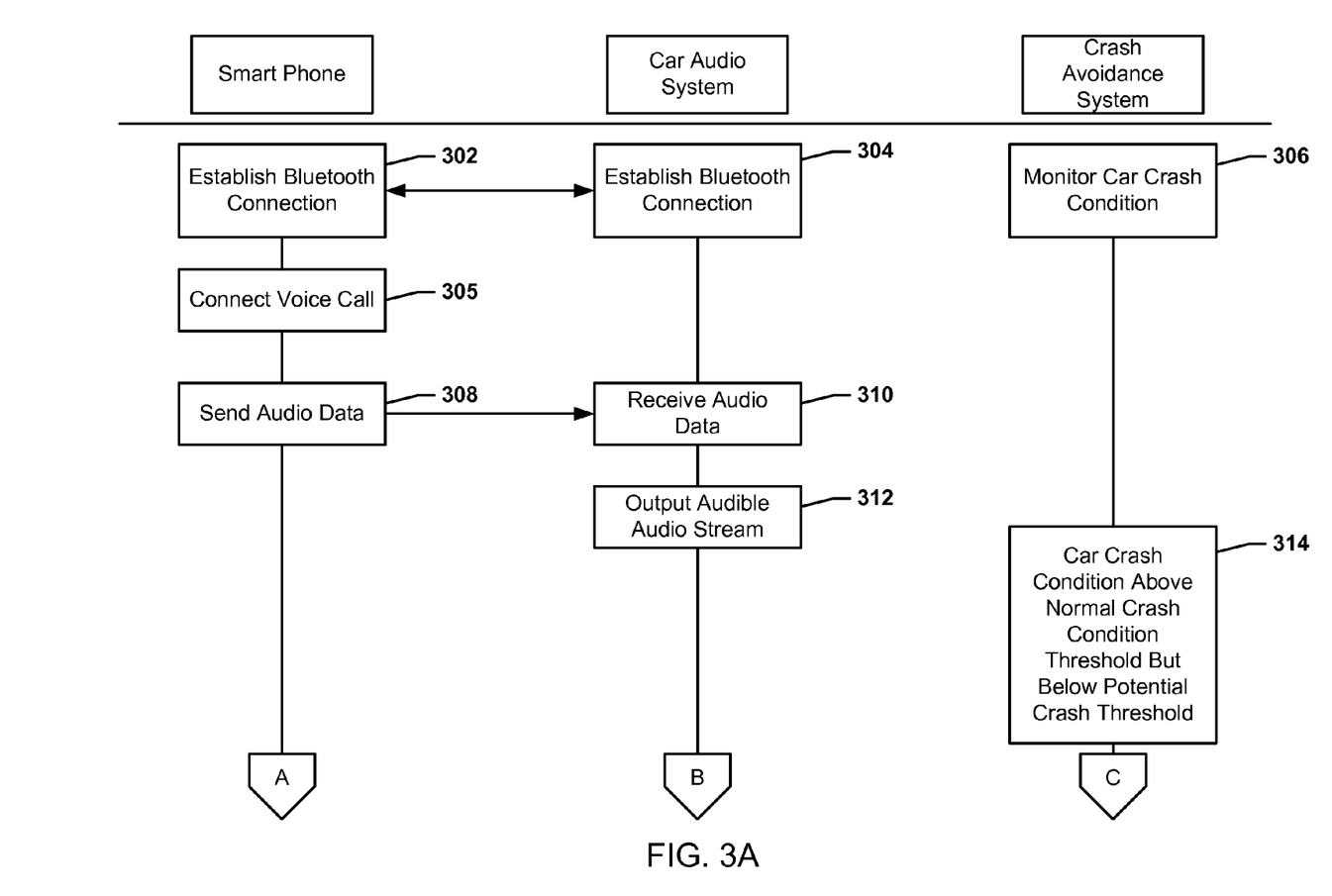
FIGS. 3A, 3B, 3C, and 3D are process flow diagrams illustrating various embodiment operations performed by an example manned machine system to train and warn a machine operator.
Figure 3B:
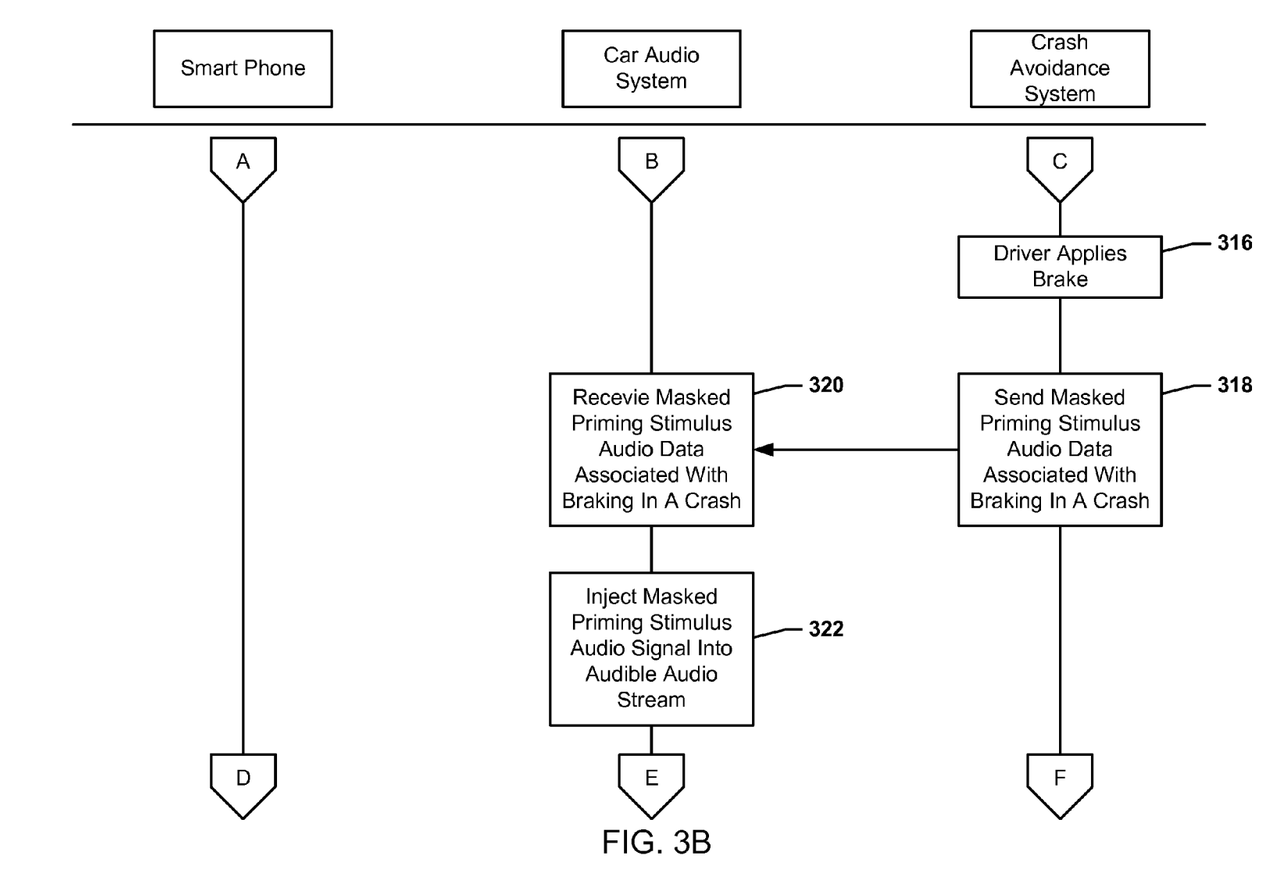
Figure 3C:
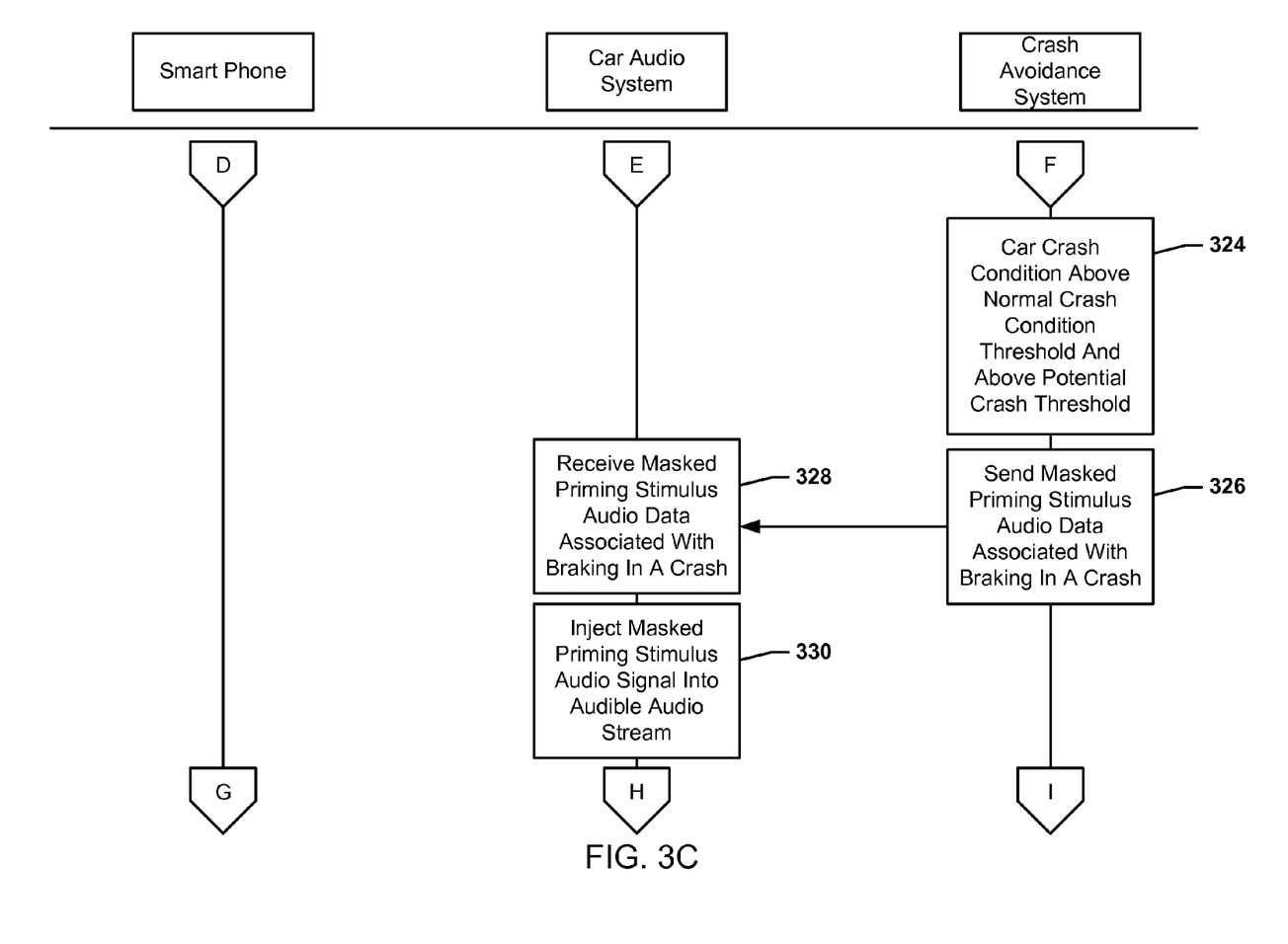
Figure 3D:
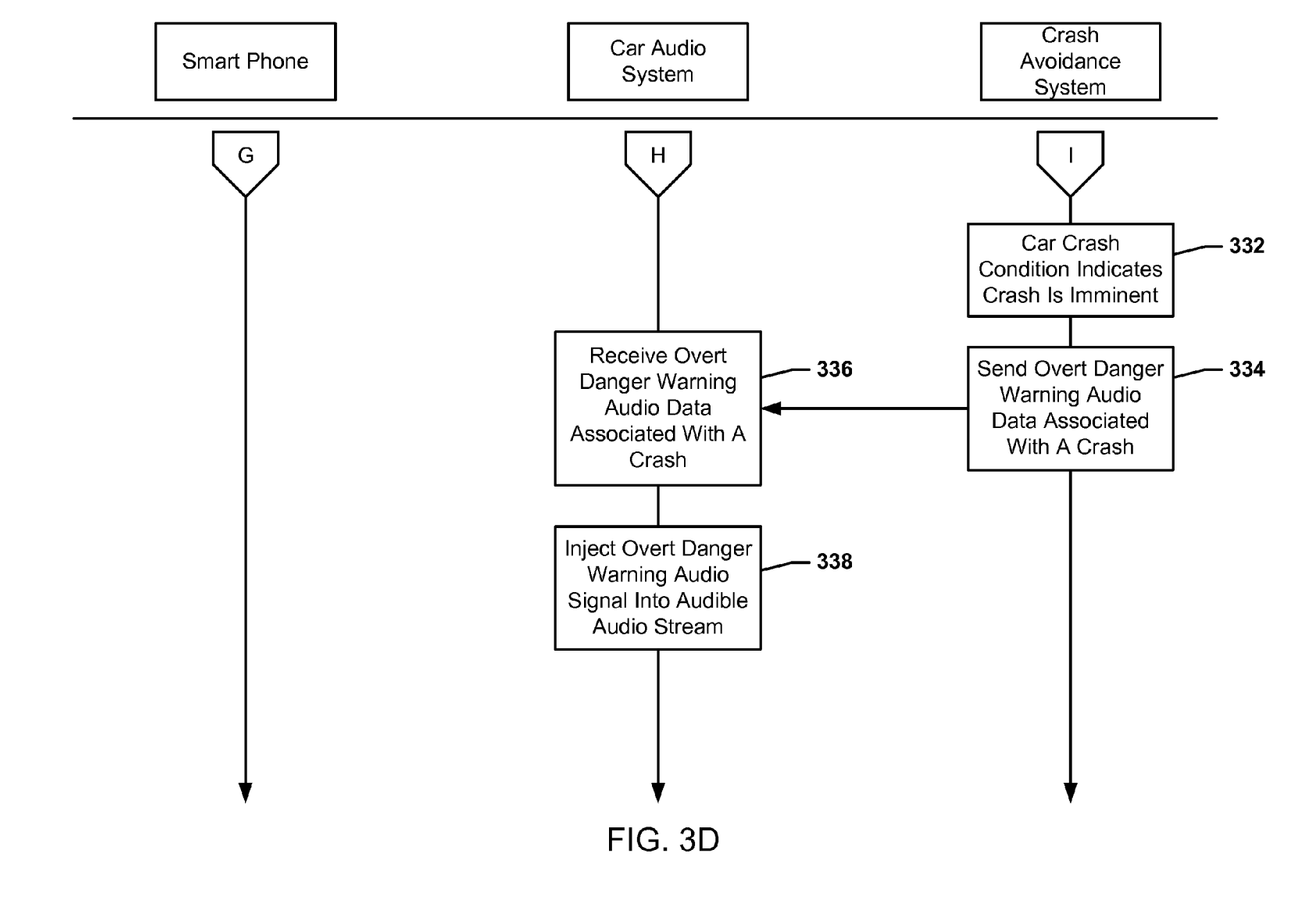

In block 305 the processor of the smart phone may connect a voice call. In block 308 the processor of the smart phone may send audio data for the call to the car audio system processor which may receive the audio data for the call and output the audible audio stream for the call in block 312.

In block 314 the processor of the crash avoidance system may determine that the car crash condition is above the normal crash condition threshold but below the potential crash threshold. In block 316 (FIG. 3B) the processor of the crash avoidance system may determine that the driver of the car applied the brake, which may be the target action associated with a crash. In block 318 the processor of the crash avoidance system may send masked priming stimulus audio data associated with braking in a crash to the car audio system which may receive the audio data in block 320. The masked priming stimulus audio data may be audio data enabling the car audio system to generate a masked priming audio stimulus signal. In block 322 the car audio system may inject the masked priming audio stimulus signal into the audible audio stream of the voice call already being output in the car. In this manner, the driver may receive the masked priming stimulus subconsciously through the audio of the ongoing voice call and may be conditioned to associate braking with the masked priming stimulus.

In block 324 (FIG. 3C), the processor of the crash avoidance system may determine that the car crash condition is above the normal crash condition threshold above the potential crash threshold. In block 326 the processor of the crash avoidance system may send masked priming stimulus audio data associated with braking in a crash to the car audio system which may receive the audio data in block 328. In block 330 the car audio system may inject the masked priming audio stimulus signal into the audible audio stream of the voice call already being output in the car. In this manner, the driver may receive the masked priming stimulus subconsciously through the audio of the ongoing voice call and when the driver has been previously conditioned, the driver may begin to respond with the target action, i.e., braking.

In block 332 (FIG. 3D) the processor of the crash avoidance system may determine that a car crash condition is imminent. In block 334 the processor of the crash avoidance system may send overt danger warning audio data associated with a crash to the car audio system which may receive the audio data in block 336. The overt danger warning audio data may be audio data enabling the car audio system to generate an audible overt danger audio warning signal (e.g., a tone or machine speech) consciously perceptible by the driver indicating a crash is imminent. In block 338 the car audio system may inject the overt danger audio warning signal into the audible audio stream of the voice call already being output in the car. In this manner, the driver may receive the indication that a crash is imminent and respond accordingly.

In an embodiment, a mobile computing device in the car, such as the driver's smartphone 104, may be used as the primary output of the masked priming stimulus, particularly in situation in which the driver is using the smartphone. For example, if the driver is holding the smartphone to his or her ear during a telephone call, the masked priming stimulus may be output via the smartphone's speaker, thus interrupting the call very briefly. Additionally, the smartphone 104 may activate a vibrator as part of the masked priming stimulus. In such embodiments, the crash avoidance system may recognize when the driver's smartphone is present (e.g., by completing a Bluetooth handshaking protocol), and use the smartphone as one or the only output for the masked priming stimulus.

Figure 4:
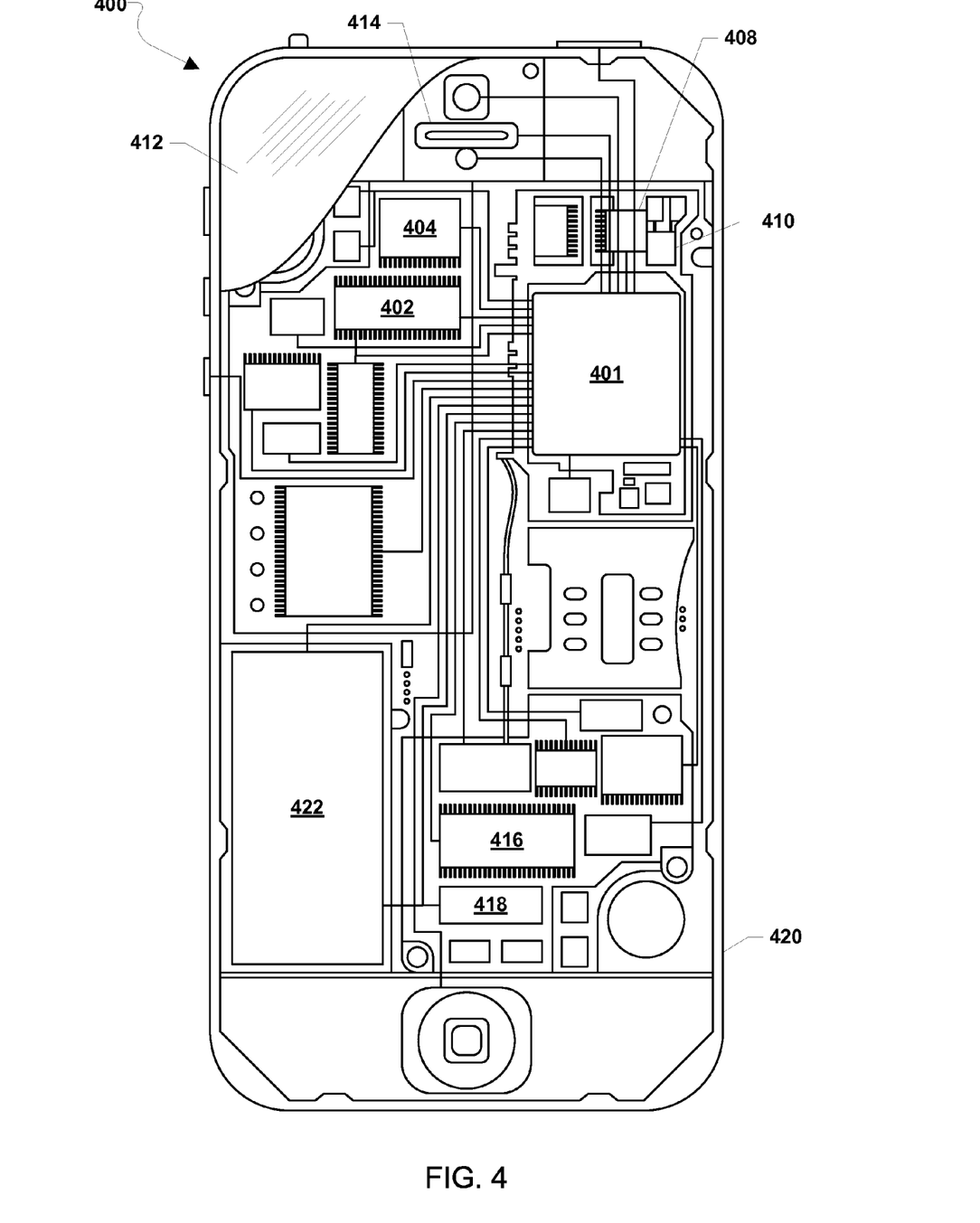
FIG. 4 is a component block diagram of a mobile computing device suitable for use with various embodiments.

The various embodiments may be implemented in a variety of mobile computing devices, an example of which in the form of a mobile computing device 400 is illustrated in FIG. 4. In various embodiments, the mobile computing device 400 may include a processor 401 coupled to a touch screen controller 404 and an internal memory 402. The processor 401 may be one or more multi-core integrated circuits (ICs) designated for general or specific processing tasks. The internal memory 402 may be volatile or non-volatile memory, and may also be secure and/or encrypted memory, or unsecure and/or unencrypted memory, or any combination thereof. The touch screen controller 404 and the processor 401 may also be coupled to a touch screen panel 412, such as a resistive-sensing touch screen, capacitive-sensing touch screen, infrared sensing touch screen, etc.

The mobile computing device 400 may have one or more radio signal transceivers 408 (e.g., Bluetooth®, ZigBee®, WiFi®, RF radio) and antennae 410, for sending and receiving, coupled to each other and/or to the processor 401. The transceivers 408 and antennae 410 may be used with the above-mentioned circuitry to implement the various wireless transmission protocol stacks and interfaces. In some embodiments, the mobile computing device 400 may include a cellular network wireless modem chip 416 that enables communication via a cellular network and is coupled to the processor.

The mobile computing device 400 may include a peripheral device connection interface 418 coupled to the processor 401. The peripheral device connection interface 418 may be singularly configured to accept one type of connection, or multiply configured to accept various types of physical and communication connections, common or proprietary, such as universal serial bus (USB), FireWire, Thunderbolt, or PCIe. The peripheral device connection interface 418 may also be coupled to a similarly configured peripheral device connection port (not shown).

The mobile computing device 400 may also include speakers 414 for providing audio outputs. The mobile computing device 400 may also include a housing 420, constructed of a plastic, metal, or a combination of materials, for containing all or some of the components discussed herein. The mobile computing device 400 may include a power source 422 coupled to the processor 401, such as a disposable or rechargeable battery. The rechargeable battery may also be coupled to the peripheral device connection port to receive a charging current from a source external to the mobile computing device 400.

The various processors described herein may be any programmable microprocessor, microcomputer or multiple processor chip or chips that can be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for warning a machine operator of a manned machine system that an emergency is imminent, comprising:
    determining, by a processor of a safety warning system of the manned machine system, whether a machine condition is at or below a potential emergency threshold;
    determining, by the processor of the safety warning system, whether a target action of the manned machine system is performed by the machine operator in response to determining that the machine condition is at or below the potential emergency threshold;
    outputting, by the safety warning system, a masked priming audio stimulus associated with the target action of the manned machine system in response to determining that the target action of the manned machine system is performed by the machine operator while the machine condition is at or below the potential emergency threshold, wherein the masked priming audio stimulus is injected into an audible audio stream output in the manned machine system;
    determining, by the processor of the safety warning system, whether the machine condition is above the potential emergency threshold;
    outputting, by the safety warning system, the masked priming audio stimulus associated with the target action of the manned machine system in response to determining that the machine condition is above the potential emergency threshold;
    determining, by the processor of the safety warning system, whether the machine condition is at or above an emergency threshold; and
    outputting, by the safety warning system, an overt danger audio warning associated with the emergency in response to determining that the machine condition is at or above the emergency threshold.

2. The method of claim 1, wherein outputting the overt danger audio warning associated with the emergency comprises injecting an overt danger audio signal into the audible audio stream being output in the manned machine system.

3. The method of claim 1, wherein the masked priming audio stimulus signal is an audio tone of 500 Hz that is played for a duration of 10 ms to 100 ms at 65 db.

4. The method of claim 1, wherein the manned machine system is a car.

5. The method of claim 4, wherein the audible audio stream is based at least in part on audio data of a mobile computing device.

6. The method of claim 5, wherein the target action is applying a brake and the emergency is an imminent crash.

7. The method of claim 5, wherein the audio data is a voice call.

8. The method of claim 2, wherein outputting, by the safety warning system, the masked priming audio stimulus associated with the target action of the manned machine system in response to determining that the target action of the manned machine system is performed by the machine operator while the machine condition is at or below the potential emergency threshold comprises determining, by the processor, whether to output the masked priming audio stimulus based on a percentage value that indicates a number of times to output the masked priming audio stimulus relative to a number of times that the target action of the manned machine system is performed by the machine operator while the machine condition is at or below the potential emergency threshold.

9. The method of claim 8, wherein the percentage value is a range of percentage values between 25 and 75 percent.

10. A safety warning system for a manned machine system, comprising:
    a processor configured with processor executable instructions to perform operations comprising:
        determining whether a machine condition is at or below a potential emergency threshold;
        determining whether a target action of the manned machine system is performed by a machine operator of the manned machine system in response to determining that the machine condition is at or below the potential emergency threshold;
        outputting a masked priming audio stimulus associated with the target action of the manned machine system in response to determining that the target action of the manned machine system is performed by the machine operator while the machine condition is at or below the potential emergency threshold, wherein the masked priming audio stimulus is injected into an audible audio stream output in the manned machine system;
        determining whether the machine condition is above the potential emergency threshold;
        outputting the masked priming audio stimulus associated with the target action of the manned machine system in response to determining that the machine condition is above the potential emergency threshold;
        determining whether the machine condition is at or above an emergency threshold; and outputting an overt danger audio warning associated with the emergency in response to determining that the machine condition is at or above the emergency threshold.

11. The safety warning system of claim 10, wherein the masked priming audio stimulus signal is an audio tone of 500 Hz that is played for a duration of 10 ms to 100 ms at 65 db.

12. The safety warning system of claim 11, wherein:
the manned machine system is a car; and
the audible audio stream is based at least in part on audio data of a mobile computing device.

13. The safety warning system of claim 12, wherein the target action is applying a brake and the emergency is an imminent crash.

14. The safety warning system of claim 12, wherein the audio data is a voice call.

15. A non-transitory processor readable medium having stored thereon processor executable instructions configured to cause a processor of a safety warning system for a manned machine system to perform operations comprising:
determining whether a machine condition is at or below a potential emergency threshold;
determining whether a target action of the manned machine system is performed by a machine operator of the manned machine system in response to determining that the machine condition is at or below the potential emergency threshold;
outputting a masked priming audio stimulus associated with the target action of the manned machine system in response to determining that the target action of the manned machine system is performed by the machine operator while the machine condition is at or below the potential emergency threshold, wherein the masked priming audio stimulus is injected into an audible audio stream output in the manned machine system;
determining whether the machine condition is above the potential emergency threshold;
outputting the masked priming audio stimulus associated with the target action of the manned machine system in response to determining that the machine condition is above the potential emergency threshold;
determining whether the machine condition is at or above an emergency threshold; and
outputting an overt danger audio warning associated with the emergency in response to determining that the machine condition is at or above the emergency threshold.

16. The non-transitory processor readable medium of claim 15, wherein the stored processor executable instructions are configured to cause a processor of a safety warning system for a manned machine system to perform operations such that the masked priming audio stimulus signal is an audio tone of 500 Hz that is played for a duration of 10 ms to 100 ms at 65 db.

17. The non-transitory processor readable medium of claim 15, wherein the stored processor executable instructions are configured to cause a processor of a safety warning system for a manned machine system to perform operations such that:
the manned machine system is a car;
the audible audio stream is based at least in part on a voice call of a mobile computing device; and
the target action is applying a brake and the emergency is an imminent crash.

* * * * *